United States Patent [19]

Norton

[11] Patent Number: 5,205,022
[45] Date of Patent: Apr. 27, 1993

[54] U-BOLT CLAMP ASSEMBLY

[76] Inventor: John F. Norton, 2814 179th Ave. NE., Redmond, Wash. 98052

[21] Appl. No.: 895,735

[22] Filed: Jun. 9, 1992

[51] Int. Cl.⁵ .................. F16L 33/00; B65D 63/00
[52] U.S. Cl. ........................ 24/277; 24/276; 285/420
[58] Field of Search ............ 24/277, 278, 275, 276; 285/420, 382.2; 248/74.1

[56] References Cited

U.S. PATENT DOCUMENTS

| | | | |
|---|---|---|---|
| 2,993,255 | 7/1961 | Jagiel | 285/420 |
| 3,178,208 | 4/1965 | Koehler | 285/420 |
| 3,209,426 | 10/1965 | Vlasak et al. | 24/277 |
| 3,284,866 | 11/1966 | Zimmerman | 24/277 |
| 4,183,122 | 1/1980 | Wagner | 24/277 |
| 4,372,017 | 2/1983 | Heckethorn | 285/382.2 |
| 4,552,390 | 11/1985 | Calmettes | 285/420 |
| 4,602,811 | 7/1986 | Heckethorn et al. | 285/382.2 |
| 4,673,151 | 6/1987 | Pelz | 248/74.1 |
| 5,014,940 | 5/1991 | Sherman | 248/74.1 |

FOREIGN PATENT DOCUMENTS

| | | | |
|---|---|---|---|
| 1286788 | 1/1962 | France | 248/74.1 |
| 0315048 | 7/1929 | United Kingdom | 248/74.1 |

Primary Examiner—Victor N. Sakran
Attorney, Agent, or Firm—Mark Zovko

[57] ABSTRACT

A clamp assembly for securing a piping system or the like to a support surface. The clamp assembly includes a U-bolt having a flattened interior surface which allows even distribution of the load from clamping on the piping system as the U-bolt is secured to the piping system. The clamp assembly also has a saddle which snaps into place over each threaded leg of the U-bolt and receives the pipe within its web. The saddle has two open cylindrical portions facing in opposite directions which interlock with the threaded legs. Preferably, the entire assembly is non-metallic allowing its use in harsh and corrosive environments.

6 Claims, 1 Drawing Sheet

U-BOLT CLAMP ASSEMBLY

BACKGROUND OF THE INVENTION

1. Field of the Invention

This invention relates in general to clamp assemblies for securing a piping system to a surface and more particularly to a clamping assembly which is non-metallic yet able to outperform conventional steel U-bolts in corrosive environments.

2. Discussion of the Prior Art

In the art of securing cylindrical members to support surfaces, problems have surfaced and still plague the industry especially when the entire system is exposed to a harsh environment. Various plastics are now used as piping in many applications. Generally, although less expensive, these plastic piping systems cannot withstand the same clamping forces as conventional stainless steel pipe. Common U-bolts have the disadvantage in that they tend to contact the pipe along a relatively narrow line and create a large load at that line. The effect is somewhat similar to subjecting the pipe to the force of a dull knife and failure of the pipe can result. Even if the piping system is stainless steel, it is possible to distort or damage the piping system with improper use of common U-bolts as clamping means.

Consequently the prior art has tried in many ways to provide a clamping system in which the load on the pipe due to securing the U-bolt is minimized. A search of the prior art has revealed the following list of possible relevent patents:

| U.S. Pat. No. | Inventor | Issue Date |
| --- | --- | --- |
| 4,249,759 | Heckethorn | 2/10/81 |
| 4,393,559 | Heckethorn et al | 7/19/83 |
| 4,388,749 | Sassak | 6/21/83 |
| 4,488,334 | Goforth | 12/18/84 |
| 4,934,635 | Sherman | 6/19/90 |
| 5,014,940 | Sherman | 5/14/91 |

These patents all show various clamp assemblies and their components which are used for securing cylindrical members to a support surface. In general, the features disclosed in these patents are different in structure or function when compared to the present invention. Arguably, the closest reference in this array of patents would be the Sherman patent (U.S. Pat. No. 5,014,940). Sherman uses a conventional U-bolt with special cushion. The cushion fits within the semi-circular part of the U-bolt and forms a saddle to receive the pipe to be secured. The cushion is retained by the U-bolt when the U-bolt is tightened and transmits the clamping force from the U-bolt across the full width of its inner surface to the pipe, thereby distributing that load. The present invention has the same objective in mind, i.e., a distribution of the clamp force across the greatest possible surface of the secured pipe. The means to achieve that end, however, are different than those proposed by Sherman in the '940 patent. The present invention does not teach a cushion as does Sherman and has the advantage of reducing the cost of the clamping assembly, yet distributes the load across a relatively large concentric surface of the pipe. Sherman's cushion can have the disadvantage of being cost prohibitive in this very competitive art. The present invention, therefore, addresses the problem solved by Sherman, but at a lesser expense. Further, in Sherman's system, the steel U-bolt and elastomeric cushion have a different chemical compatibility. In the present invention, the U-bolt and saddle are made from injection molded thermoplastic and are chemically compatible.

A further disadvantage of a conventional metal U-bolt can be seen in certain situations involving PVC coated or painted pipes in corrosive environments. The conventional metal U-bolt, when tightened down due to line contact and hardness, may break the coating of the pipe, thereby exposing the pipe directly to the corrosive environment. The present invention has the advantage in this situation of distributing the stress on the pipe evenly due to its interior flat surface. Further, the U-bolt of the present invention is preferably thermoplastic and similar in hardness to the coating or paint used on the pipe, thereby minimizing the abovementioned problems.

SUMMARY OF THE INVENTION

The present invention comprises a clamp assembly for securing a cylindrical member to a surface. The clamp assembly includes as a component a U-shaped member commonly referred to as a U-bolt. The U-bolt has a semi-circular bight portion and a pair of parallel threaded legs. The semi-circular bight portion has a flattened interior surface, i.e., the surface that will contact the cylindrical member or most commonly a run of pipe. The flattened interior surface allows full contact of the U-bolt with the pipe when the pipe is secured by the U-bolt. Further advantages of this flattened surface will be discussed subsequently. The clamp assembly also provides a saddle for use with the U-bolt. The saddle has a web portion with a semi-circular interior surface for receiving the pipe to be secured. The saddle also has two parallel cylindrical portions on either end of the web portion. The cylindrical portions have a cut out portion so as to allow fitting of each cylindrical portion over the threaded legs of the U-bolt. Additionally, the cut out portions of the cylindrical portions are faced 180° from each other when the saddle is fit on the threaded legs of the U-bolt. The saddle with the cylindrical portions is so sized as to snap into place and interlock with the threaded legs of the U-bolt. The U-bolt and saddle are fastened down to the surface with conventional threaded nuts. Preferably, the U-bolt and saddle are made from injection molded thermoplastic.

The entire system has advantages over conventional systems found in the prior art. Accordingly, it is an object of the present invention to provide a clamp assembly which will outperform steel U-bolt assemblies in harsh and corrosive environments.

Another object of the present invention is to provide a U-bolt as part of an overall clamp assembly which provides an improved load distribution over the pipe to be secured.

Yet another object of the present invention is to provide a U-bolt which has a full contact surface with the pipe to be secured.

Still another object of the present invention is to provide a clamp assembly which reduces the possibility of distorting or damaging the pipe system to be held.

A further object of the present invention is to provide a clamp assembly which is superior in chemical resistance to 316 stainless steel.

Another object of the present invention is to provide a clamp assembly that is economical, lightweight, non-conductive and resistant to sunlight.

DETAILED DESCRIPTION OF THE PREFERRED EMBODIMENT

Figure 1:
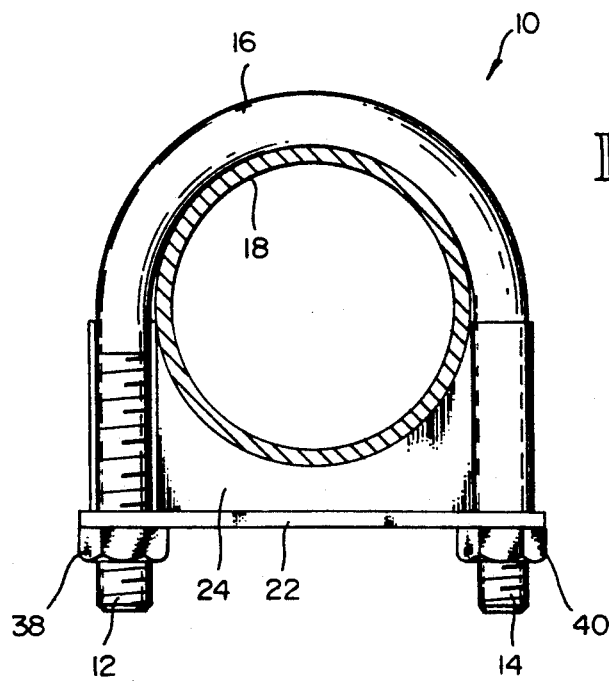
FIG. 1 shows a clamp assembly of the present invention in a front elevation view.
Figure 2:
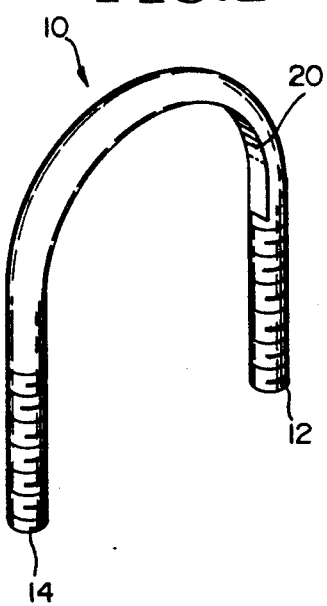
FIG. 2 shows a U-bolt in accordance with the present invention in a perspective view.

Referring to the Figures, the invention can now be described. FIG. 1 shows a U-shaped bolt generally designated as 10 having a pair of threaded legs 12 and 14. The U-bolt 10 also has a bight portion 16 which is semi-circular in shape and adapted to receive a pipe 18 of a piping system. Referring to FIG. 2, the flattened interior surface 20 of the U-bolt 10 can be seen. As seen from FIG. 1, interior surface 20 makes contact with pipe 18 when the pipe 18 is secured to support surface 22. The entire area of interior surface 20 makes contact with the outer surface of pipe 18. A saddle 24 is also provided as part of the clamping system of the present invention. Saddle 24 has a web portion 26 and two cylindrical portions 28 and 30 which are located at each end of web portion 26. Web portion 26 has an upper surface 32 which is semi-circular in shape and adapted to receive the pipe 18 within the web portoon 26 when the saddle 24 is used in the clamping system as shown best in FIG. 1.

Figure 3:
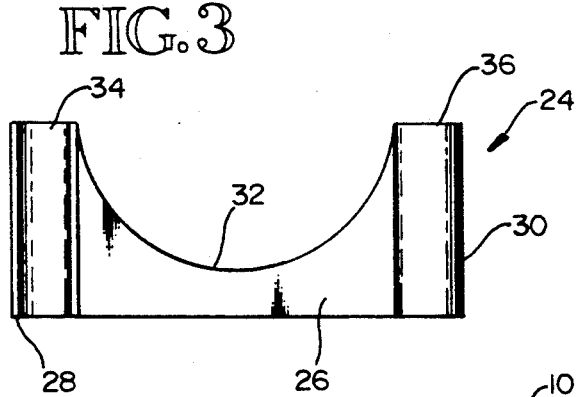
FIG. 3 shows a front view of the saddle in accordance with the present invention.
Figure 4:
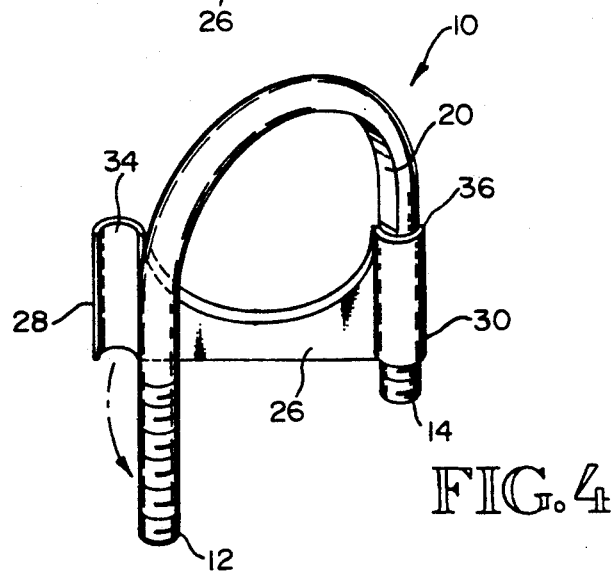
FIG. 4 is a perspective view showing attachment of the saddle to the U-bolt.

The cylindrical portions 28 and 30 of saddle 24 have longitudinal slots 34 and 36, respectively, therein. These slots 34 and 36 are adapted to allow the cylindrical portions 28 and 30 of web 24 to fit over threaded legs 12 and 14 of U-bolt 10. The slots 34 and 36 are facing 180° from each other as best shown in FIG. 3. Preferably, the cylindrical portions 28 and 30 are sized relative to the threaded legs 12 and 14 so as to allow an interlocking fit between the threaded leg and respective cylindrical portion. Having the slots 34 and 36 facing away from each other allows an easy snap fit of first one cylindrical portion of web 24 over a threaded leg, then the other cylindrical portion of web 24 over the other threaded leg. The entire clamping assembly can be secured with nuts 38 and 40 as shown in FIG. 1.

To use the clamping system to secure a pipe 18 to a support surface 22, the following steps can be taken. First, the U-bolt 10 can be fit over the pipe 18 with the flattened interior surface 20 of the bight portion 16 of U-bolt 10 contacting the outside of the pipe 18. The saddle 24 can be fit into the threaded legs, first by placing one threaded leg in a slot of one cylindrical portion of the web 24 and then snap fitting the other threaded leg into the other cylindrical portion of web 24 through the other slot. The pipe 18 is then cradled by the saddle 24 and bight portion 16 of the U-bolt 10. Nuts 38 and 40 can then be tightened so that the pipe 18 is secured to the support surface 22.

The entire system can be used in harsh or corrosive environments by fabricating the components including the U-bolt from fiberglass or glass-reinforced resin, and the saddle from a thermoplastic without compromising the integrity of performance of the system.

The invention may be embodied in other forms without departing from the spirit or essential characteristics thereof. The present embodiments are therefore to be considered in all respects as illustrative and not restrictive, the scope of the invention being indicated by the appended claims rather than the foregoing description, and all change which comes within the meaning and range of equivalency of claims is intended to be embraced therein.

I claim:

1. A clamp assembly for securing a cylindrical member comprising
   a. A U-shaped member having a semi-circular bight portion and a pair of parallel threaded legs;
   b. saddle means having a web portion with a semi-circular interior surface for receiving the cylindrical member to be secured, said saddle means having two parallel cylindrical portions on either end of said web portion, said cylindrical portion having a longititudinal cutout portion so as to allow fitting of said cylindrical portions over said threaded legs of said U-shaped member, said cutout portions of said cylindrical portions facing 180° from each other when said saddle means is fitted on said threaded legs of said U-shaped member, said saddle means having cylindrical portions so sized as to interlock with said threaded legs of said U-shaped member; and
   c. fastening means fitting on said threaded legs of said U-shaped member for securing the clamp assembly to the cylindrical member.

2. The clamp assembly of claim 1 wherein said U-shaped members is thermoplastic.

3. The clamp assembly of claim 1 wherein said saddle means is thermoplastic.

4. A clamp assembly for securing a cylindrical member comprising
   a. a U-shaped member, said U-shaped member having a semi-circular bight portion and a pair of parallel threaded legs, said semi-circular bight portion having a flattened interior surface so as to allow full contact of said flattened interior surface with the cylindrical member when the cylindrical member is secured by said U-shaped member;
   b. saddle means having a web portion with a semi-circular interior surface for receiving the cylindrical member to be secured, said saddle means having two parallel cylindrical portions on either end of said web portion, said cylindrical portions having a longitudinal cutout portion so as to allow fitting of said cylindrical portion over said threaded legs of said U-shaped member, aid cutout portion of said cylindrical portion facing 180° from each other when said saddle means is fitted on said threaded legs of said U-shaped member, said cylindrical portions of said saddle means so sized as to interlock with said threaded legs of said U-shaped member; and
   c. fastening means fitting on said threaded legs of said U-shaped member for securing the clamp assembly to the cylindrical member.

5. The clamp assembly of claim 4 wherein the U-shaped member is thermoplastic.

6. The clamp assembly of claim 5 wherein the saddle means is thermoplastic.

* * * * *